United States Patent [19]

Ellis, Jr.

[11] 4,184,580

[45] Jan. 22, 1980

[54] COIN OPERATED BATTERY CHARGER AND CHARGING SYSTEM CHECK

[76] Inventor: Austin J. Ellis, Jr., 528 K St., Rio Linda, Calif. 95673

[21] Appl. No.: 806,669

[22] Filed: Jun. 15, 1977

[51] Int. Cl.² ............................................. G07F 17/00
[52] U.S. Cl. ................... 194/1 R; 194/9 T; 320/2
[58] Field of Search .................. 194/1 R, 6, 9 R, 9 T, 194/11; 320/2

[56] References Cited

U.S. PATENT DOCUMENTS

| | | | |
|---|---|---|---|
| 2,659,042 | 11/1953 | Anderson et al. | 320/2 |
| 2,966,248 | 12/1960 | Armbruster | 320/2 X |
| 3,307,096 | 2/1967 | Lyon | 320/2 X |

FOREIGN PATENT DOCUMENTS 1474950  8/1969  Fed. Rep. of Germany .......... 194/9 T

*Primary Examiner*—Joseph J. Rolla
*Attorney, Agent, or Firm*—Blair, Brown & Kreten

[57] ABSTRACT

Disclosed herein is a structure for fast charging six or twelve volt storage batteries from a compact coin operated station. In addition, it is also provided herein to check the charging system and voltage output in any vehicle associated with a six or twelve volt battery. Besides the checking capabilities mentioned above, this system is also suitable for checking the starting system, and the battery itself.

3 Claims, 3 Drawing Figures

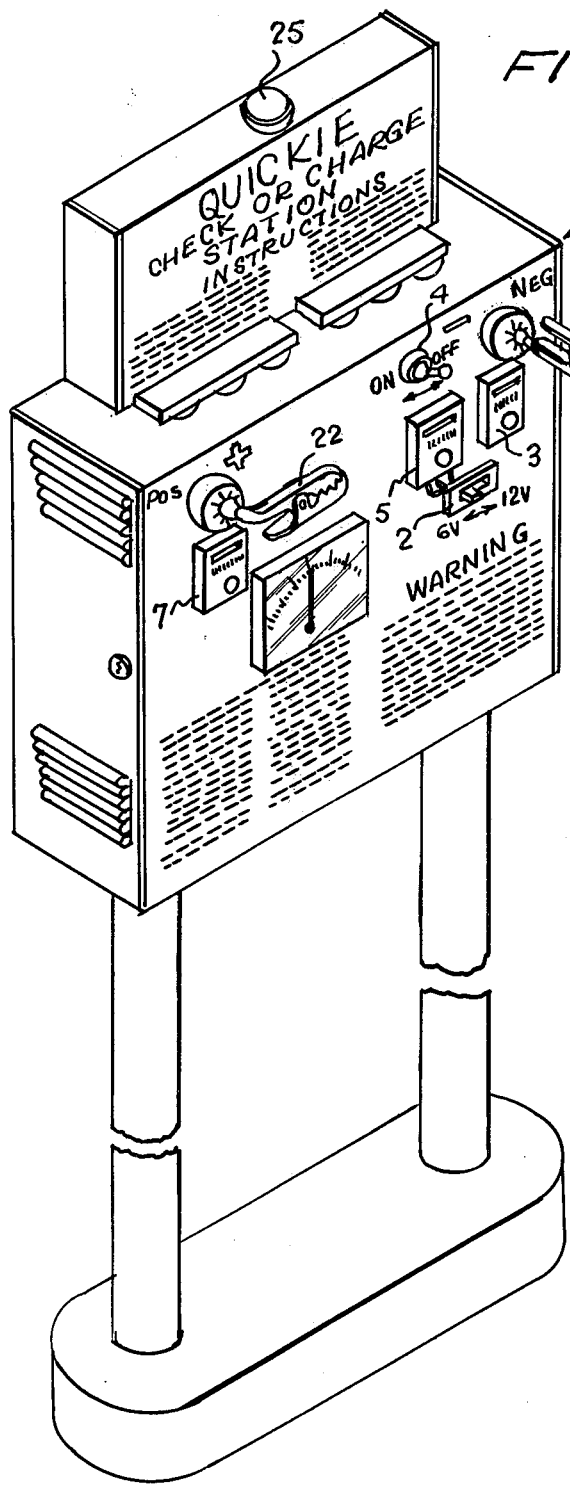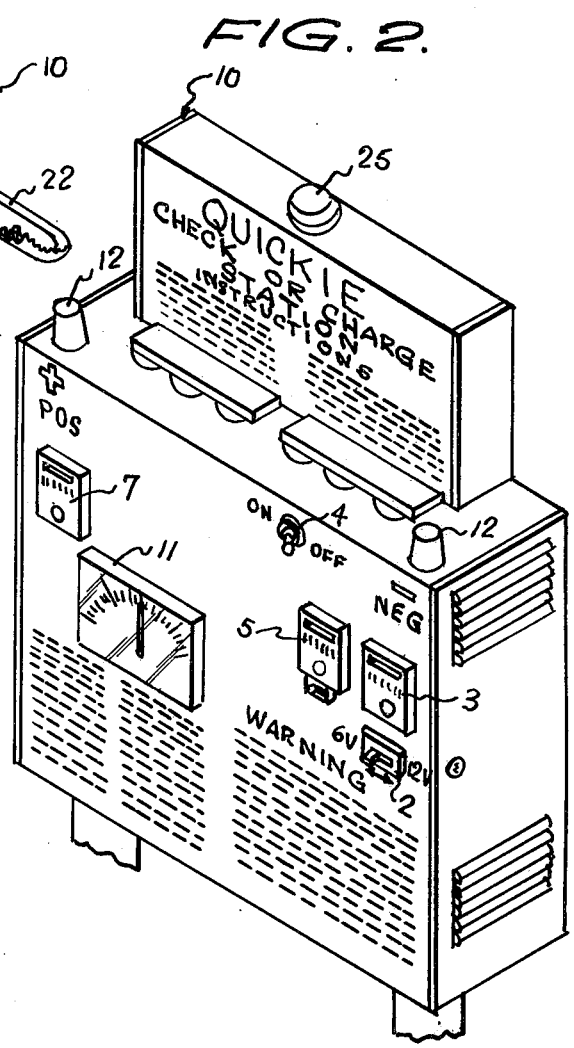

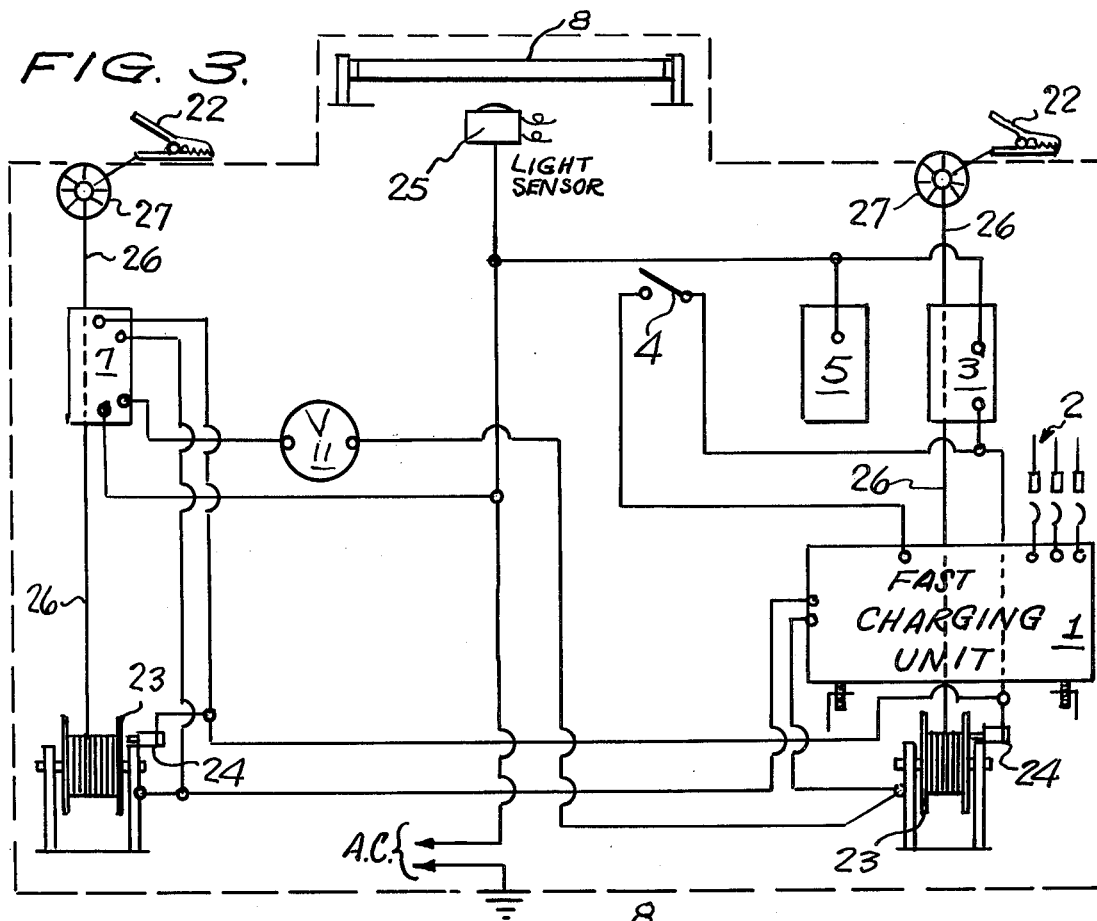
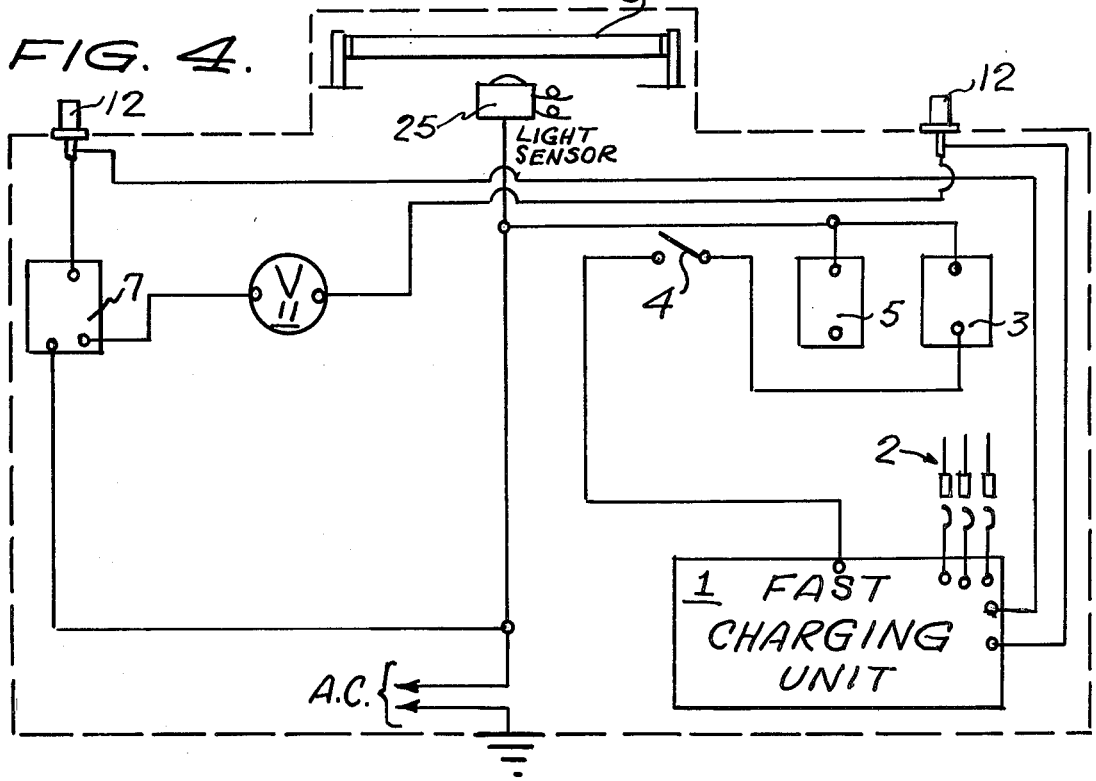

COIN OPERATED BATTERY CHARGER AND CHARGING SYSTEM CHECK

BACKGROUND OF THE INVENTION

Field of the Invention

Due to the transition precipitated by major oil companies in which service stations providing gasoline and oil and other services are being converted to just gas and go type operations, a demand for self service, coin operated, 24-hour battery charger and charging system check has been created.

It is well known that the life of a battery such as one used in an automobile, depends upon its being provided with a full charge. A battery which has been over charged, or under charged, and is allowed to continue in this state, does not have the same life expectancy as a battery which has the proper degree of charge. Consequently, the voltage output in all vehicle's charging systems should be checked from time to time to make sure that the voltage setting is correct. For example, a high voltage setting can shorten the light bulb filament life in a vehicle by 50% or more. In modern passenger cars today, most monitoring systems for the entire electrical system consist merely of a warning light that is actuated when the charging of the system stops all together. This in itself does not provide adequate information relative to the state of the battery, for extending, or maximizing its useful life, not to mention the electrical components such as the lights which are associated with the battery and the charging system.

SUMMARY OF THE INVENTION

Accordingly it is contemplated that a device which could provide an automobile owner with these facts relating to the charging of the automobile system, would allow the motorist to protect his investment that he has in his car.

It is therefore an object of this invention to provide the motorist with a means for checking his vehicle's charging system at any time and at a minimal cost.

Another object of the invention is to provide the public access to a fast charger for their automobiles on a 24-hour basis.

Other objects and advantages will become apparent in the following specification when considered in light of the attached drawings.

BRIEF DESCRIPTION OF THE DRAWINGS

FIG. 1 shows a three quarter view of a coin operated battery charger and charging system check having retractable battery cables;

FIG. 2 shows a device similar to FIG. 1 with terminal posts provided in place of the battery cables;

FIG. 3 shows schematically the structure within the casing viewed in FIG. 1; and FIG. 4 shows the circuitry associated with the casing viewed in FIG. 2.

DESCRIPTION OF THE PREFERRED EMBODIMENT

Referring to the drawings now, in which like numerals refer to like parts throughout, reference numeral 10 generally denotes the casing for each of the battery chargers and check systems.

It is to be noted that the casings 10 associated with these charging systems have a contour generally similar in appearance to that of a battery, which affords an eye catching and attractive display media for the service offered. The following description of course relates to both systems since the major difference between the two is the retractable cables seen in FIGS. 1 and 3.

Reference numeral 2 generally denotes a switch mechanism which allows one to select either a six volt or twelve volt output. Reference numeral 3 is directed to the coin operated charger and timer assembly. This coin drop mechanism 3 is operatively connected to an AC/outlet and insertion of the coins is the requirement for completing the circuit. The fast charging unit numeral 1 seen in FIGS. 3 and 4 is of conventional configuration, i.e., is a standard battery charger comprising heavyduty industrial type configuration including full wave rectifier, hi-velocity cooling, polarity protection, double-wound isolation transformer, and a DC/circuit breaker to prevent damage to the charger or the battery. Numeral 4 denotes an on/off switch which is connected to the AC/circuit and the charging unit 1 to provide the consumer with a means for discontinuing the service until the terminals from the battery to the charger have been properly connected. Reference numeral 5 denotes a dispensing device which is coin actuated which may be in the preferred embodiment also electrically operated, but may also be fastened as a manually operated rotary type coin dispenser for dispensing screw charging posts suitable for use in side terminal batteries. For as many batteries have their terminal posts on the top side of the battery the so called side terminal batteries are becoming increasingly popular. In order to assure a good connection at the point of juncture with the side terminal battery, conventional jumper cable clips are not easily attachable to these side terminal batteries. Therefore this dispenser would provide charging posts which are actuated by screws put into the terminals on a side type battery to afford ease in providing a charge to the battery. For best results, the cables associated with the battery and the automobile are to be removed to allow these screw charging posts to be inserted.

A third coin box denoted by numeral 7 is also associated with the mechanism to provide means by which a motorist can check the charging system of his automobile. Associated with coin box 7 is a volt meter having a suitable gradations thereon to provide a quantitative indication as to the efficiency of the automotive charging system in question. Preferably the volt meter 11 has a range from zero to eighteen volts which can depict over charging and high voltage, a poor alternator, generator, or regulator, a faulty starter, a weak battery on a six or twelve volt system.

A light sensor 25 is depicted schematically as being above the casings in both FIGS. 1 and 2, and is shown for the sake of convenience to be below fluorescent tube 8 in the schematic drawings of FIGS. 3 and 4. The light sensor however is oriented in the case as shown in FIGS. 1 and 2, and it provides a means by which fluorescent tube 8 in FIGS. 3 and 4 and disposed in the top portion of casings 10 are to be actuatable. That is to say, light sensor 25 is suitably constructed to denote sundown and sunrise, such conditions being the criteria by which fluorescent lamp 8 is selectively energized and deenergized, respectively. All the above identified components therefore are operatively connected to an AC/source, which provides the power for allowing this mechanism 10 to operate.

In operation, upon insertion of coins in boxes 3 or 7, and appropriate orientation of voltage choice 2, and circuit breaker 4, energy is provided to terminal posts 12 in FIG. 4 or cable clamps 22 in FIG. 3. When the coins have been deposited in box 7, of course the volt meter is energized for readings as to the state of the electrical system of the automobile to be tested.

Regarding FIGS. 1 and 3, the retractable cables system comprises the following preferable structure. A cable 26 has at one extremity clamp member 22 which is provided with stop means 27 comprising a round rubber boot. Behind the boot, are guide rollers to allow the power cable 26 to transfer its motion from a direction exterior of the casing to an associated drum 23 at the bottom of the casing. Drum 23 allows for the cable whose extremity at this point is connected to wind up and be stored on drum 23. Associated with this drum 23 is a solenoid 24 having an ratchet lock means at its extremity nearest the drum to provide a positive lock for the cables on the drum to prevent the cable from being played out, before money has been inserted in the coin timer. Upon insertion of money into either of the timers 3 or 7, the locking mechanism on solenoid 24 is removed, and the cables 26 and clamps 22 are capable of extraction from the drum and casing to an automobile.

Regarding FIGS. 2 and 4, the terminal posts 12 are preferably comprised of cast antimonial-lead for durability and conductive qualities. The terminal posts have a flanged bottom portion and are cast with a threaded stud protruding from the bottom center of the post. This allows insertion of the post to an associated receptor within the casing, and provides an easy means for replacing these terminals when they have deteriorated from use. The receptor within the casing for fastening these terminal posts may include a lock washer and nut which is accessible only from the interior of the cabinet, to insure that these terminals will remain on the casing until an authorized person opens the casing to remove it.

Referring to FIGS. 2 and 4, in order to use the unit with the top terminals the customer must use his own jumper (Booster Cables).

Having thus described the preferred embodiment of the invention it should be understood that numerous structural modifications and adaptations may be resorted to without departing from the spirit of the invention.

What is claimed is:

1. An electrical checking or charging station comprising charging means, coin operated means for actuating said charging means, a voltage checking means and terminal post means associated with said voltage checking means and said charging means to be connected to a vehicle for testing and charging, and a safety switch connected between said first coin operated means and said charging unit to selectively engage and disengage said charging unit, a voltage selection means connected to said charging means to select a desired voltage, and a second coin operated means provided to dispense screw charging posts for use in side terminal batteries.

2. The apparatus of claim 1 in which a light sensor is disposed on a casing surrounding said battery charger and checker to actuate a fluorescent light in the on position when it is dark and in the off position when it is light out.

3. The apparatus of claim 2 in which said terminal post means comprises a pair of cables, a pair of cable clamps disposed at the respective extremities of each of said cables, stop means disposed at a portion of a casing to constrain said cable clamps from retraction into said casing, a pair of drums oriented to wind said cables thereon about the other extremity of said cables, and solenoid lock means connected to said drums to prevent playing out of said cables until solenoid lock means have been deenergized by putting money in one of the appropriate coin boxes.

* * * * *